United States Patent
Lochocki, Jr. et al.

(10) Patent No.: US 9,200,704 B2
(45) Date of Patent: Dec. 1, 2015

(54) TRANSMISSION WITH COMMANDED GEAR SHIFT MONITORING LOGIC

(71) Applicant: GM GLOBAL TECHNOLOGY OPERATIONS LLC, Detroit, MI (US)

(72) Inventors: Ronald F. Lochocki, Jr., Ypsilanti, MI (US); Brian Hanselman, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 14/227,348

(22) Filed: Mar. 27, 2014

(65) Prior Publication Data

US 2015/0276052 A1    Oct. 1, 2015

(51) Int. Cl.
*G06F 17/00* (2006.01)
*F16H 61/26* (2006.01)
*F16H 61/00* (2006.01)

(52) U.S. Cl.
CPC ........ *F16H 61/26* (2013.01); *F16H 2061/0012* (2013.01)

(58) Field of Classification Search
None
See application file for complete search history.

(56) References Cited

U.S. PATENT DOCUMENTS

| | | | | |
|---|---|---|---|---|
| 6,148,256 | A * | 11/2000 | Graf et al. | 701/53 |
| 6,411,880 | B1 * | 6/2002 | McKee et al. | 701/55 |
| 7,505,842 | B2 * | 3/2009 | Luh | 701/55 |
| 7,740,557 | B2 * | 6/2010 | Kondo et al. | 477/69 |

* cited by examiner

*Primary Examiner* — Dirk Wright
(74) *Attorney, Agent, or Firm* — Quinn Law Group, PLLC

(57) ABSTRACT

A vehicle includes an engine, input clutch, transmission, and controller. The transmission includes an input member, output member, and bidirectional speed sensor. The speed sensor measures a magnitude and direction of a rotational speed of the output member. Engagement of the input clutch selectively connects the engine to the input member. The controller has a commanded gear shift monitoring (CGSM) module. The CGSM module executes a method via a processor to cause the controller to detect a requested shift of the transmission to a destination gear, and to receive the measured magnitude and direction from the speed sensor. The controller determines a calibrated maximum output speed for the destination gear using the measured magnitude and direction, and executes a control action with respect to the transmission when the measured magnitude exceeds the calibrated maximum output speed. A transmission assembly includes the transmission and controller.

20 Claims, 1 Drawing Sheet

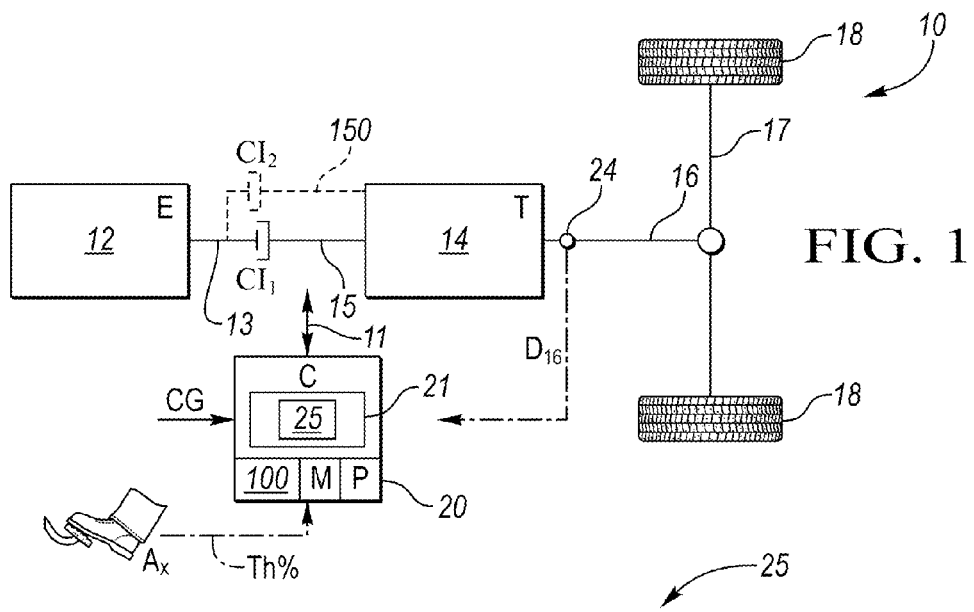
FIG. 1
FIG. 2
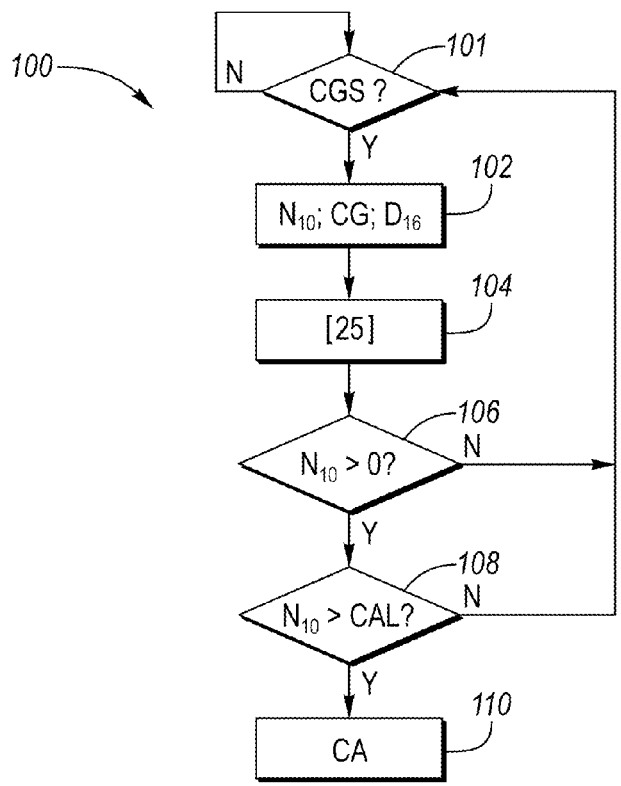
FIG. 3

TRANSMISSION WITH COMMANDED GEAR SHIFT MONITORING LOGIC

TECHNICAL FIELD

This disclosure relates to a transmission with commanded gear shift monitoring logic.

BACKGROUND

Automotive transmissions come in a variety of configurations. For instance, a dual clutch transmission (DCT) includes two input clutches for respectively selecting oddly-numbered and evenly-numbered gear sets. In a DCT, a transmission controller predicts a next-selected gear in a particular shift progression using various control input values such as engine acceleration, vehicle speed, and braking levels, and then stages the next-selected gear ahead of the impending shift. Relative to an automatic transmission, such staging can produce faster gear shift speeds, with the DCT design also providing improved shift control and power. An automated manual transmission (AMT) is similar in structure to a DCT but has only one input clutch. An automatic transmission, which may utilize a hydrodynamic torque converter assembly in lieu of a friction input clutch, uses multiple planetary gear sets and friction clutches to establish a desired output speed ratio. All of these transmission designs use shift progression logic to determine which gear states to select and when to select them.

SUMMARY

A vehicle is disclosed herein having an internal combustion engine, a transmission, and a controller. The transmission includes an input member and one or more input clutches, i.e., a friction clutch or a hydrodynamic torque converter assembly. The controller includes a commanded gear shift monitoring (CGSM) module, with the term "module" referring to associated hardware and associated software of the controller. The CGSM module is programmed to actively monitor commanded gear states during a requested downshift or other requested shift of the transmission, and to enforce calibrated vehicle speed limits based on the commanded gear states. The CGSM module is intended to help protect the transmission against engine over-speed conditions and resultant vehicle deceleration events. The CGSM module can operate in any of the transmission types outlined above, i.e., a DCT, an AMT, or an automatic transmission.

In its operation, the controller determines the commanded gear state for a requested shift and also receives a measured speed of the vehicle, for instance from a bidirectional transmission output speed sensor (TOSS). Using the CGSM module, the controller compares the measured speeds to calibrated maximum vehicle speed limits, which may be predetermined and recorded in a lookup table in memory as calibrated values. As part of this approach, the calibrated lookup table may be populated with the maximum vehicle speed limits and indexed or referenced by the commanded gear and an existing speed direction of the output member of the transmission. Measured speed values and directions from the TOSS are then compared to the calibrated maximum speed limits from the lookup table, with the limits possibly adjusted in some embodiments using the throttle level as explained herein. When the calibrated maximum vehicle speed limits are exceeded, the controller executes suitable control actions with respect to the transmission or other powertrain components, such as executing a default shift and/or recording a diagnostic code.

Ordinarily, shift control logic enforces a particular shift progression to ensure that the transmission does not attempt a shift exceeding certain vehicle deceleration thresholds, for instance a certain gravitational (G) force level within a particular window of time, or that may otherwise adversely affect the performance or physical integrity of the clutches, engine, and/or other powertrain components. The present approach is thus intended to serve as a high-level monitoring system suitable for providing backup speed enforcement logic for a requested shift maneuver. When functioning properly, existing shift progression logic should enforce suitable speed limits. However, in the event of a transient software error in the shift progression logic, the present monitoring logic may still act to ensure the integrity of the powertrain while maintaining a desired quality of the overall shift feel.

A transmission assembly is also disclosed herein for use with an engine and an input clutch. The transmission assembly includes an input member, an output member, a bidirectional speed sensor, and a controller. The sensor is positioned with respect to the output member, for instance on or near the output member. The speed sensor measures a magnitude and a direction of a rotational speed of the output member. Engagement of the input clutch selectively connects the engine to the input member. The controller has a processor, tangible, non-transitory memory, and CGSM module as described herein.

The CGSM module executes instructions from memory via the processor to cause the controller to detect a requested shift of the transmission to a destination gear, e.g., a downshift, and to receive the measured magnitude and direction from the bidirectional speed sensor. The controller, via the CGSM module, also identifies the destination gear for the requested shift, determines a calibrated maximum output speed for the destination gear using the measured magnitude and direction, and executes a control action with respect to the transmission when the measured magnitude exceeds the calibrated maximum output speed.

A method is also disclosed for monitoring a commanded gear shift in a vehicle having an engine, a transmission, and a controller. The method executes the steps noted above, i.e., detecting a requested shift of the transmission to a destination gear, measuring a magnitude and direction of a rotational speed of the output member via a bidirectional speed sensor, and receiving, via the controller, the measured magnitude and direction from the bidirectional speed sensor.

The method further includes identifying the destination gear for the requested shift, and determining a calibrated maximum output speed for the destination gear state using the measured magnitude and direction from the bidirectional speed sensor. A control action is executed via the controller with respect to the transmission when the measured magnitude exceeds the calibrated maximum output speed.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 1 is a schematic illustration of a vehicle having a transmission and a controller that includes a commanded gear shift monitoring (CGSM) module as set forth herein.

FIG. 2 is table describing commanded gears and speed directions for use by the CGSM module shown in FIG. 1.

FIG. 3 is a flow diagram of example logic for the CGSM module shown in the vehicle of FIG. 1.

DETAILED DESCRIPTION

Referring to the drawings, wherein like reference numbers refer to like components throughout the several Figures, an example vehicle 10 is shown schematically in FIG. 1. The vehicle 10 includes an internal combustion engine (E) 12, a transmission (T) 14, and a controller (C) 20. The controller 20 includes a commanded gear shift monitoring (CGSM) module 21, embodied as computer hardware and software, which provides monitoring and control logic for enforcing calibrated maximum vehicle speed limits for a requested shift of the transmission 14. As part of this function, the CGSM module 21 may reference a calibrated lookup table 25, an example of which is shown in FIG. 2, in executing a method 100, example steps of which are shown in FIG. 3. Using the CGSM module 21, the controller 20 is thus able to provide backup monitoring to existing shift progression logic of the controller 20.

The transmission 14 shown schematically in FIG. 1 includes an input member 15 and an output member 16. The transmission 14 may be alternatively embodied as a multi-speed automatic transmission, a dual-clutch transmission (DCT), or an automated manual transmission (AMT) in various embodiments. Each of these designs is generally described above. The output member 16 in all embodiments provides output torque from the transmission 14 to a drive axle 17, and from the drive axle 17 to a set of drive wheels 18 to propel the vehicle 10.

In an automatic transmission embodiment, a first input clutch $CI_1$, e.g., a hydrodynamic torque converter assembly, may be used to couple an output shaft 13 of the engine 12 to the input member 15 of the transmission 14. In a DCT embodiment, first and second input clutches $CI_1$ and $CI_2$ may be used for this purpose, e.g., conventional friction plate clutches, with the first input clutch $CI_1$ used to select any evenly-numbered gear sets, e.g., $2^{nd}$, $4^{th}$, $6^{th}$, and $8^{th}$ gear, and the second input clutch $CI_2$ used to select any oddly-numbered gear sets, e.g., $1^{st}$, $3^{rd}$, $5^{th}$, and $7^{th}$ gear, and reverse. Separate input members 15 and 150 may be used in a DCT embodiment as shown. An AMT, as is known in the art, has a single input clutch, e.g., $CI_1$, but otherwise acts much like a DCT.

The controller 20 shown in FIG. 1 may be part of a transmission control module of the type known in the art, or it may be a separate module. In either embodiment, the controller 20 actively monitors certain powertrain variables during a commanded shift of the transmission 14, including a commanded gear (arrow CG), which as used herein means the next-selected/destination gear of a commanded gear shift. For example, in a 7-5 power downshift of an example 8-speed transmission, $5^{th}$ gear is the destination gear.

Other values received and processed by the controller 20 as part of the method 100 may include a throttle level (arrow Th %) from a throttle input device $A_X$, e.g., an accelerator pedal, such as a position or travel of such a pedal, and measured values from a bidirectional transmission output speed sensor (TOSS) 24 positioned with respect to the output member 16. With respect to the term "bidirectional", this term refers to the capability of the TOSS 24 to determine not only the speed magnitude ($N_O$) of the output member 16, but also the present forward or reverse (F/R) speed rotational direction of the output member 16. The TOSS 24 may be embodied as a Hall effect or magnetoresistive sensor in two possible non-limiting embodiments.

The controller 20 of FIG. 1 may be embodied as a transmission control module that communicates with the various elements of the vehicle 10, for instance with the engine 12, the transmission 14, the TOSS 24, and the input clutches $CI_1$ and $CI_2$, over a controller area network (CAN) bus 11 or other suitable network path. The speed of the engine 12 is responsive to the throttle level (arrow Th %). The throttle level (arrow Th %) may be commanded by a driver of the vehicle 10 as a force and/or a percentage of travel of the throttle input device $A_X$ to indicate a relative level of requested engine speed or torque. Such force/travel may be detected via a throttle sensor (not shown) in the conventional manner.

Still referring to FIG. 1, the controller 20 may be configured as a computer device having associated hardware elements such as a processor P and memory M. The memory M may include, but is not necessarily limited to, tangible non-transitory computer-readable media such as read only memory (ROM), optical memory, solid state flash memory, and the like, as well as random access memory (RAM), electrically-erasable programmable read-only memory (EEPROM), flash memory, etc. The controller 20 may also include circuitry including but not limited to a high-speed clock, analog-to-digital (A/D) circuitry, digital-to-analog (D/A) circuitry, a digital signal processor or DSP, transceivers, and the necessary input/output (I/O) devices and other signal conditioning and/or buffer circuitry needed for executing the method 100, which will now be described with reference to the remaining Figures.

Referring to FIG. 2, the commanded gear shift monitoring (CGSM) module 21 shown schematically in FIG. 1 is populated with or has access to a lookup table 25. The controller 20 of FIG. 1 uses the CGSM module 21 and the lookup table 25 to determine a calibrated maximum speed limit for the vehicle 10. The controller 20, as noted above, may also include shift control logic with which the controller 20 enforces a threshold output speed for each destination gear state, with the CGSM module 21 providing a fallback monitoring approach to such logic. The CGSM module 21 may provide calibrated maximum speed limits for the vehicle 10 that are at least 10 percent higher than, i.e., faster than, the threshold output speeds from any such commanded gear shift or shift progression monitoring logic.

In an example configuration, the lookup table 25 is indexed or organized by a commanded gear (CG) and the measured forward/reverse direction of the output member 16 as measured by the TOSS 24, with the measured direction abbreviated as $D_{16}$ in FIG. 2. The range of commanded gears depends on the design of the transmission 14 shown in FIG. 1. For instance, in an 8-speed transmission the lookup table 25 may have a reverse (R) gear state as well as $1^{st}$-$8^{th}$ gear (1-8) as shown. The direction of rotation of the output member 16 of FIG. 1, as noted above, includes forward (F) and reverse (R).

Within the lookup table 25, each commanded gear R and 1-8 has a corresponding speed limit value for the forward and reverse directions. By way of example, for a reverse (R) commanded gear, a calibrated maximum speed limit $N_{RF}$ is enforced when the speed direction $D_{16}$ from the TOSS 24 of FIG. 1 is presently forward (F), and a different calibrated maximum speed limit $N_{RR}$ when the speed direction $D_{16}$ is presently reverse (R). Similar values can be used for $1^{st}$ gear ($N_{1F}$, $N_{1R}$), $2^{nd}$ gear ($N_{2F}$, $N_{2R}$), etc. All forward directions in the lookup table 25 may be similarly populated, e.g., with $3^{rd}$-$8^{th}$ gears having speed limit values $N_{3F}$-$N_{8F}$, respectively. Where a value is absent in FIG. 2, these situations indicate unlikely-to-occur shifts, such as a commanded shift to $8^{th}$ gear while traveling in reverse. In an example transmission 14, for instance, speed limits may be omitted for $3^{rd}$-$8^{th}$ gear reverse shifts, or these gear states may be populated with speed limits as desired.

In a non-limiting example, $1^{st}$ gear when commanded in a forward direction of the output member 16 of FIG. 1 may be provided with a +45-50 KPH limit, i.e., $N_{1F}$=+45-50 KPH. For $N_{1R}$, however, which is a reverse direction of the output member 16, this level may be substantially lower, such as −10 KPH to −12 KPH, with the negative (−) prefix indicating the reverse direction of rotation of the output member 16. Normal shift progression logic may enforce a lower speed in $1^{st}$ gear, e.g., −5 KPH, and so as noted above, the CGSM module 21 will not act unless and until a fault condition is present in the existing shift control logic. Similarly, if a reverse (R) gear state is commanded when the rotational speed direction $D_{16}$ is reverse, −45 to −50 KPH may be used as the speed limit $N_{RR}$, while a lower limit of −10 to −12 KPH may be used. In other gears, limits may be set just below an engine over-speed hazard.

In an alternative approach, the speed limits populating the lookup table 25 of FIG. 2 may be adjusted in some manner by throttle level (arrow Th %). Such an approach may provide greater programming or calibration flexibility. For instance, if the speed limit $N_{1F}$ is +56 KPH, enforcing this speed limit may have a different effect at 5% throttle level (arrow Th %) versus 70%. In other words, the transmission 14 of FIG. 1 might be able to tolerate +60 KPH because the engine 12 is revving at a higher level than it is at just 5% throttle. Thus, during calibration or in real time, the lookup table 25 may optionally "upscale" the calibrated maximum speed limit using the throttle level (arrow Th %). This adjustment of the calibrated speed limit may be by lookup table or via formula, for example $N_{CAL,NEW}=(N_{CAL})(K)$, where $N_{CAL}$ is the recorded calibrated speed limit in the lookup table 25 and K is a gain calculated in real time as a function of the variance of the throttle level (arrow Th %) from a nominal throttle level used to populate the lookup table 25, e.g., 50% throttle.

Referring to FIG. 3, the method 100 executed by the controller 20 of FIG. 1 is shown in an example embodiment commencing with step 101. At step 101, the controller 20 of FIG. 1 detects a requested shift of the transmission 14 from a present gear state to a destination gear state. In an example embodiment, the controller 20 may be programmed only to execute the method 100 for requested downshifts, although in other embodiments, upshifts and other requested shifts may be used as the requested shift. Step 101 may include determining whether a commanded gear shift (CGS) of the transmission 14 is requested.

As the transmission 14 is automatic, DCT, or AMT, this step may be accomplished in logic of the controller 20 using the controller's inherent knowledge of the shift progression that the controller 20 is commanding as part of its primary functionality. That is, for an automatic transmission the input and output speeds of the transmission 14 may be used by the controller 20 to determine whether and when a shift is needed. Other approaches may include detecting the position of any clutch forks used to select a particular gear in a DCT or AMT, or any other suitable approach for determining a commanded gear state. The requested shift may be limited to downshifts, as noted above, in a non-limiting embodiment. Step 101 is repeated until a commanded gear shift is detected or otherwise determined. The method 100 proceeds to step 102 once a commanded gear shift is determined.

At step 102, the controller 20 of FIG. 1 receives the output speed and direction ($N_{10}$, $D_{16}$) from the TOSS 24, for instance via a transceiver (not shown) of the controller 20, and also temporarily records the commanded gear (CG) in memory M as determined in step 101. Once these values are determined at step 102, the method 100 proceeds to step 104.

Step 104 entails referencing the lookup table 25 described above, and extracting the calibrated maximum speed limit from the lookup table 25 for the commanded gear and rotational direction of the output member 16. The method 100 then proceeds to step 106.

At step 106, the controller 20 next determines if the speed of the vehicle 10, from step 102 is substantially non-zero, i.e., zero or within a low speed band of zero. An example speed band that is substantially non-zero is an absolute speed in excess of 4 KPH. For such low speeds, the controller 20 may effectively apply artificially high speed limits, such as 1000 KPH, to ensure that a fault condition is never determined within 4 KPH of zero speed, or if an overspeed condition is not otherwise recognized from the lookup table 25. The method 100 repeats step 102 if the measured speed $N_{10}$ of the vehicle 10 is substantially zero. Otherwise, the method 100 proceeds to step 108.

Step 108 includes determining whether the measured vehicle speed $N_{10}$ for a given rotational direction $D_{16}$ is greater than the calibrated speed limit, as determined in step 104 from the lookup table 25. If not, a control action is not taken by the CGSM module 25 of FIG. 1, and the method 100 returns to step 102. The method 100 proceeds to step 110, however, if the calibrated maximum speed limit is exceeded.

At step 110, the controller 20 executes a control action (CA) with respect to the transmission 14 or other powertrain components such as the engine 12 in response to violation of the calibrated maximum speed limits from the lookup table 25. Suitable control actions may entail recording a diagnostic code and/or enforcing a default shift of the transmission 14. For example, the transmission 14 could be automatically shifted to neutral, to a hydraulic default gear, or upshifted by at least one gear, e.g., if in $4^{th}$ gear, shifting to $5^{th}$ gear or higher, so as to move the transmission 14 out of an over speed condition. Other control actions may be envisioned within the scope of the invention, such as slowing the vehicle 10 itself via braking, e.g., antilock braking control, and/or by control of the engine 12, and/or waiting for the vehicle 10 to slow sufficiently prior to allowing the shift to the commanded gear to proceed.

The CGSM module 21 of FIG. 1 as described above may be used as set forth above to monitor commanded gear states and transmission output speeds/directions, and to enforce speed limits in response to these values. The controller 20 may selectively disable the CGSM module 21 in certain transmission gear states such as Park and Neutral, for instance by temporarily preventing execution of the method 100, as potential deceleration hazards do not exist in such gear states. Likewise, as noted above a calibrated low, non-zero band of vehicle speeds may be considered a zone in which all gear shifts are permitted, as well as a zone in which noise from the TOSS 24 may be prevalent. No control actions need to be taken in this band of speeds. As a result, a non-obtrusive set of logic is provided that can ensure the operating integrity of existing shift progression logic while optimizing performance of the transmission 14.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
an engine;
an input clutch;
a transmission having an input member, an output member, and a bidirectional speed sensor positioned with respect to the output member that is configured to measure a magnitude and direction of a rotational speed of the output member, wherein an engagement of the input clutch selectively connects the engine to the input member; and
a controller having a processor, tangible, non-transitory memory, and a commanded gear shift monitoring (CGSM) module, wherein the CGSM module executes instructions from the memory via the processor to cause the controller to:
detect a requested shift of the transmission to a destination gear;
receive the measured magnitude and direction from the bidirectional speed sensor;
identify the destination gear for the requested shift of the transmission;
determine a calibrated maximum speed of the vehicle for the destination gear using the measured magnitude and direction; and
execute a control action with respect to the transmission when the measured magnitude exceeds the calibrated maximum speed.

2. The vehicle of claim 1, wherein the control action includes setting a diagnostic code in the memory of the controller.

3. The vehicle of claim 2, wherein the control action also includes executing a default shift of the transmission to a default gear state or neutral.

4. The vehicle of claim 1, further comprising a throttle input device operable for requesting a throttle level, wherein the controller is in communication with the throttle input device and is programmed to adjust the calibrated maximum output speed using the throttle level.

5. The vehicle of claim 1, further comprising a lookup table recorded in the memory and indexed by the destination gear and the direction from the bidirectional speed sensor, wherein the controller determines the calibrated maximum speed by accessing the lookup table in response to the detected requested shift and extracting the calibrated maximum speed from the lookup table.

6. The vehicle of claim 1, wherein the controller is programmed to disable the CGSM module when the transmission is in a Park or a Neutral state.

7. The vehicle of claim 1, wherein the input clutch is a single input clutch and the transmission is an automatic transmission or an automated manual transmission.

8. The vehicle of claim 1, wherein the input clutch includes a first and a second input clutch, and wherein the transmission is a dual-clutch transmission.

9. A transmission assembly for use with an engine and an input clutch, the transmission assembly comprising:
an input member;
an output member;
a bidirectional speed sensor positioned with respect to the output member that is configured to measure a magnitude and direction of a rotational speed of the output member, wherein an engagement of the input clutch selectively connects to the input member; and
a controller having a processor, tangible, non-transitory memory, and a commanded gear shift monitoring (CGSM) module, wherein the CGSM module executes instructions from the memory via the processor to cause the controller to:
detect a requested shift of the transmission to a destination gear;
receive the measured magnitude and direction from the bidirectional speed sensor;
identify the destination gear for the requested shift;
determine a calibrated maximum output speed for the destination gear using the measured magnitude and direction; and
execute a control action with respect to the transmission when the measured magnitude exceeds the calibrated maximum output speed.

10. The transmission assembly of claim 9, wherein the control action includes setting a diagnostic code in the memory of the controller.

11. The transmission assembly of claim 10, wherein the control action also includes executing a default shift of the transmission to a default gear state or neutral.

12. The transmission assembly of claim 9, further comprising a throttle input device operable for requesting a throttle level, wherein the controller is in communication with the throttle input device and is programmed to adjust the calibrated maximum output speed using the throttle level.

13. The transmission assembly of claim 9, further comprising a lookup table recorded in the memory and indexed by the destination gear and the direction from the bidirectional speed sensor, wherein the controller determines the calibrated maximum output speed by accessing the lookup table in response to the detected requested shift and extracting the calibrated maximum output speed from the lookup table.

14. The transmission assembly of claim 9, wherein the controller is programmed to disable the CGSM module when the transmission is in a Park or a Neutral state.

15. A method of monitoring a commanded gear shift in a vehicle having an engine, a transmission having an output member, and a controller, the method comprising:
detecting, via the controller, a requested shift of the transmission to a destination gear;
measuring a magnitude and direction of a rotational speed of the output member via a bidirectional speed sensor;
receiving, via the controller, the measured magnitude and direction from the bidirectional speed sensor;
identifying the destination gear for the requested shift;
determining a calibrated maximum output speed for the destination gear state using the measured magnitude and direction from the bidirectional speed sensor; and
executing a control action via the controller with respect to the transmission when the measured magnitude exceeds the calibrated maximum output speed.

16. The method of claim 15, wherein executing a control action includes recording a diagnostic code via the controller.

17. The method of claim 15, wherein executing a control action includes executing a shift of the transmission to a default gear state or neutral.

18. The method of claim 15, wherein the vehicle includes a throttle input device in communication with the controller and operable for determining a throttle level, the method further comprising adjusting the calibrated maximum output speed using the throttle level.

19. The method of claim 15, wherein determining a calibrated maximum output speed for the destination gear includes extracting the calibrated maximum output speed from a lookup table.

20. The method of claim 15, wherein measuring the magnitude and direction includes using a bidirectional Hall effect sensor.

\* \* \* \* \*